J. M. ROBBINS & J. F. CREW.
VULCANIZING DEVICE.
APPLICATION FILED SEPT. 20, 1910.
1,013,063.
Patented Dec. 26, 1911.
2 SHEETS—SHEET 2.
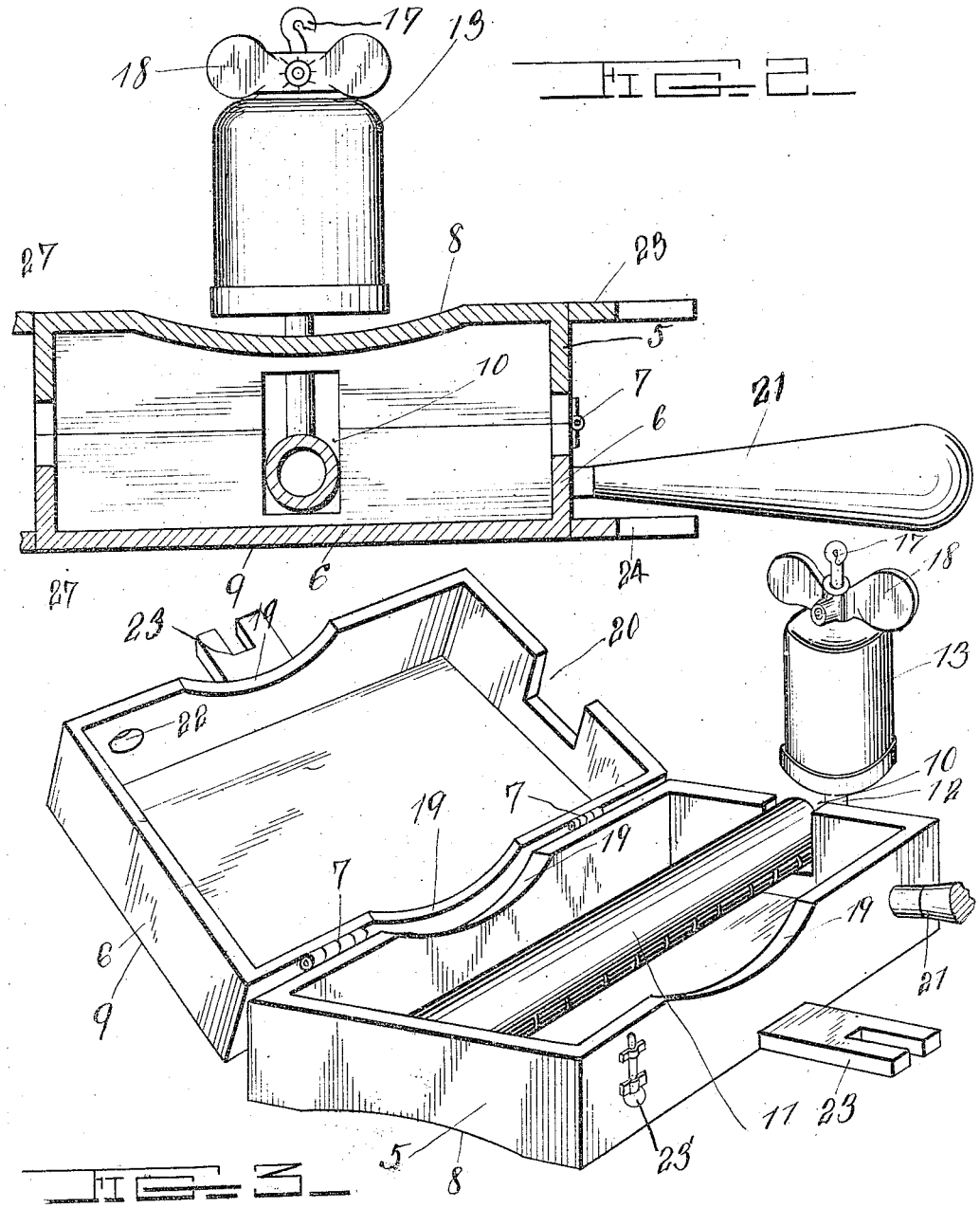
Witnesses
Inventors
James M. Robbins
and John F. Crew.
By 
Attorneys

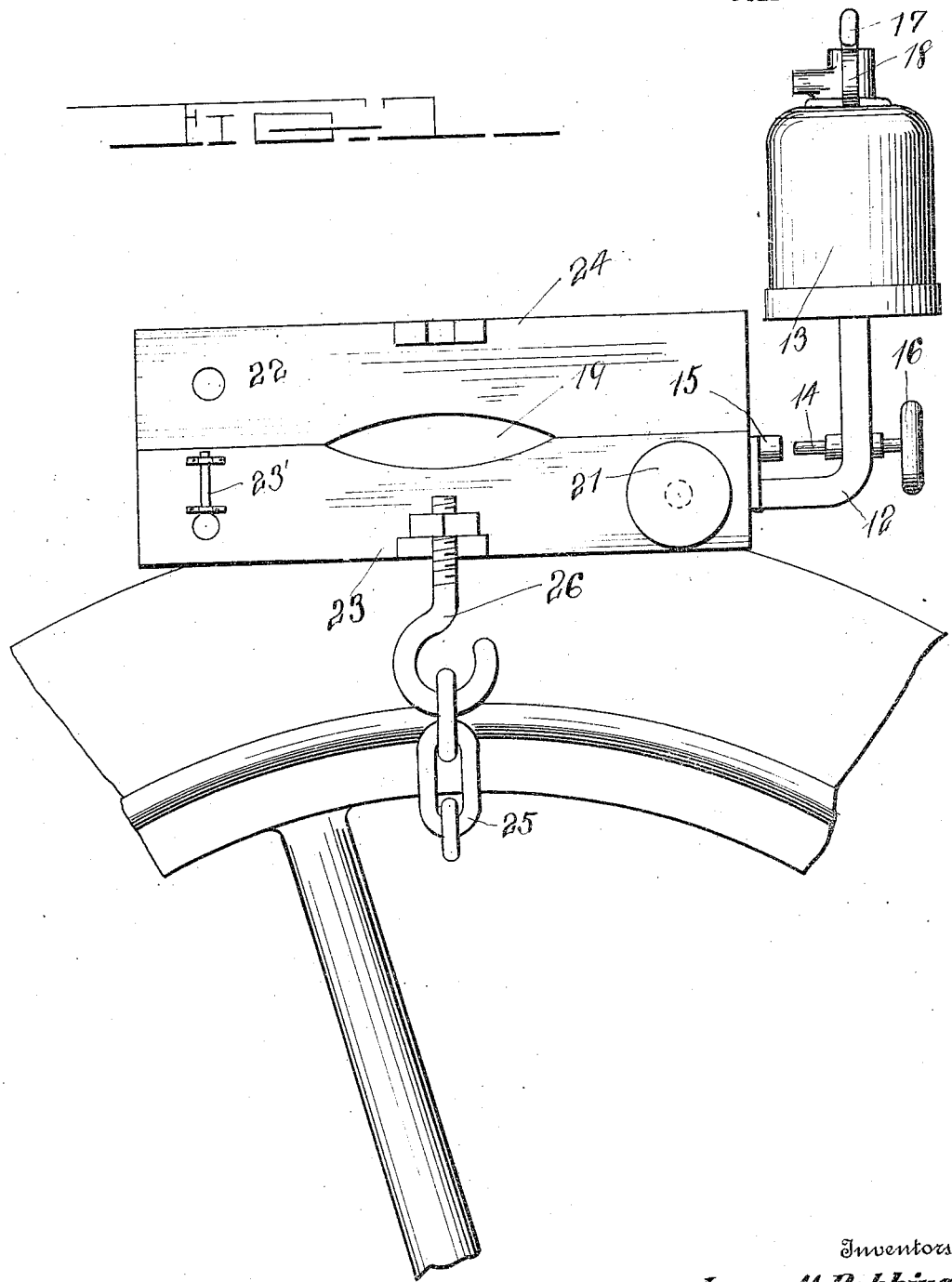

UNITED STATES PATENT OFFICE.

JAMES M. ROBBINS AND JOHN F. CREW, OF ROCHELLE, TEXAS.

VULCANIZING DEVICE.

1,013,063.  Specification of Letters Patent.  Patented Dec. 26, 1911.

Application filed September 20, 1910. Serial No. 582,898.

*To all whom it may concern:*

Be it known that we, JAMES M. ROBBINS and JOHN F. CREW, citizens of the United States, residing at Rochelle, in the county of McCulloch, State of Texas, have invented certain new and useful Improvements in Vulcanizing Devices; and we do hereby declare the following to be a full, clear, and exact description of the invention, such as will enable others skilled in the art to which it appertains to make and use the same.

This invention relates to improvements in vulcanizing devices and the leading object of the same is the production of a simple vulcanizing tool whereby tires can be vulcanized on a wheel or removed from a wheel.

Another object of the invention is to provide a vulcanizing device which can be manufactured cheaply and which comprises a box having hinged sections and a burner removably located thereon whereby either one of the sections can be brought into contact with the rubber to be vulcanized.

With the above and other objects in view the invention consists in certain constructions, combinations and arrangements of parts, clearly described in the following specification and clearly illustrated in the accompanying drawings, in which:—

Figure 1 is a side elevation showing the improved vulcanizing device mounted on a tire positioned on a wheel. Fig. 2 is a vertical sectional view taken through the vulcanizing box and the burner. Fig. 3 is a perspective view showing the vulcanizing box opened.

Referring to the accompanying drawings illustrating the preferred embodiment of the invention 5 denotes the vulcanizing box section which is adapted to contact with a tire mounted on a wheel and 6 denotes the vulcanizing box section which is adapted to contact with the tire removed from a wheel and positioned upon a table or other support. The box 6 is hinged at 7 so that the two sections thereof can fold on one another, and each section is formed substantially like the other section with the exception that the outer face of the section 5 is concaved at 8 and the outer face of the section 6 is formed flat at 9. The section 5 is formed with a slot 10 in one of its end walls, and a hydrocarbon burner 11 is disposed in said section and suitably connected as by means of a bracket 12 with a fuel tank 13. The upper end of the bracket 12 is formed with a passage whereby the fuel or oil contained in the tank 13 can pass therefrom and said bracket carries a needle valve 14 which is adapted to project a jet of oil or fuel into the intake end 15 of the burner 11. The needle valve 14 carries a suitable handle 16 whereby the same may be manipulated. The tank 13 is provided with a closure plug 17 which is secured in locked position by means of a winged nut 18.

The side walls of the box sections 5 and 6 are cut away at 19 so that a passage will be provided for the discharge of the products of combustion from the vulcanizing device. The section 6 is formed with a cut away portion 20 in one of its end walls adjacent to the end wall having the cut away portion or slot 10 of the section 5, whereby the burner 11 may be secured in position on the box section 6 when desired. The box section 5 has detachably secured thereto a handle 21 which may be secured to the box section 6, which section is provided with an opening 22. A suitable thermometer 23' is mounted on the box section 5 whereby the temperature in the device can be determined.

The box section 5 is provided with a slotted arm 23 and the box section 6 is provided with a similar arm 24. A chain 25 is adapted to be passed around the felly of a wheel and secured by means of a hook 26 to the arm 23 and to a second arm 27 carried by the opposite side of the box 5 whereby said box can be held snugly against a tire to be vulcanized which is mounted upon a wheel.

In using the device for vulcanizing tires on wheels the box 5 is positioned on the tire over the place to be vulcanized, after the margin of the puncture in the tire has been properly prepared and oil is supplied to the burner and the oil ignited so as to produce proper flames. The upper box is then closed and the device held in position over the tire until the proper changes are produced to effect the vulcanizing when it is desired to employ the device for vulcanizing tires removed from wheels the box section 6 is employed and the device properly secured against the tire on a table or other support.

What is claimed is:—

In a vulcanizing device, a box, consisting of two sections hingedly connected, the opposing contacting side edges of each section having registering cut away portions forming an opening for the discharge of the products of combustion, cut away portions also formed in each end wall and adapted to register when the sections are in contacting relation, a burner disposed longitudinally in one of the sections and supported in one of the cut away portions of an end wall, whereby when the sections are reversed the burner may be supported within the cut away portion of the opposite section, a tank for supplying fluid to said burner, a handle projecting from one side of a section, and means for clamping either one of the sections to a tire.

In testimony whereof, we affix our signatures, in presence of two witnesses.

JAMES M. ROBBINS.
JOHN F. CREW.

Witnesses as to the signature of James M. Robbins:
W. H. ADKINS,
J. M. FULLER.

Witnesses as to the signature of John F. Crew:
R. G. MAINS,
E. A. DOUDNA.

Copies of this patent may be obtained for five cents each, by addressing the "Commissioner of Patents, Washington D. C."